Oct. 11, 1949.                M. THORSSON                 2,484,324
                        THREE-BUCKET COUNTING SCALE
                           Filed Aug. 17, 1944
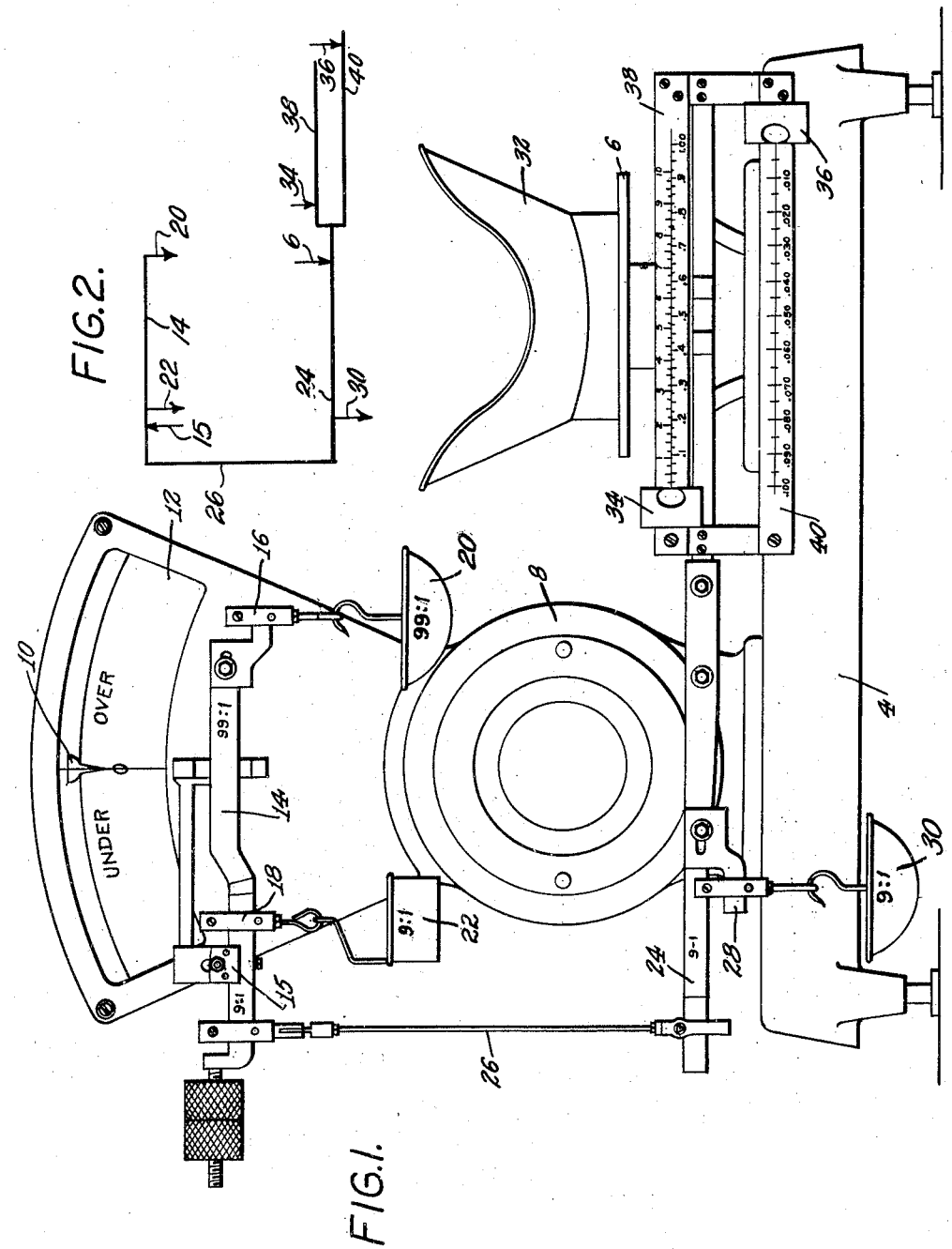
INVENTOR.
MATTHEW THORSSON
BY Frederick Griswold, Jr.
ATTORNEY Patented Oct. 11, 1949

2,484,324

UNITED STATES PATENT OFFICE 2,484,324

THREE-BUCKET COUNTING SCALE

Matthew Thorsson, Rutland, Vt.

Application August 17, 1944, Serial No. 549,883

4 Claims. (Cl. 265—30)

This invention relates to scales which may be used for either weighing or counting or for both weighing and counting at the same time.

An object of the invention is the provision of a scale which may be used either for weighing or for counting, in which the mechanism used for weighing is unaffected by the setting of the counter poises on the mechanism used for counting and vice versa.

Another object of the invention is a disposition of the parts wherein counting may be accomplished over a wide range.

More particularly the invention relates to the provision, on a two pan weighing and counting scale, for instance, of a third weighing point introduced on an extension of the main platform lever at a point bearing the relationship of eleven to one ratio with the main platform so that said pan will maintain a nine to one ratio relative to the ninety-nine to one counting pan, thereby providing a more sensitive counting means for handling those light loads which would be incapable of ascertaining on the prior art scale or give too great an error in handling on the main platform.

Yet another object of the invention is the provision of beams on the main platform so graduated as to give indications of weight bearing a predetermined relationship to the weights in a ratio pan.

These and other objects of the invention and the means for their attainment will be more apparent from the following detailed description, taken in connection with the accompanying drawing illustrating one embodiment by which the invention may be realized and in which:

Fig. 1 illustrates a scale in front elevation wherein counting and weighing may be effected in accordance with this invention.

Fig. 2 shows diagrammatically the construction of the scale.

The base 4 of the scale houses and supports the platform levers, not shown, but common in the art, and which in turn support the platform 6 on which is shown a commodity receiver 32. The base 4, at the rear, is illustrated as surmounted by a housing or head 8 which houses automatic load counterbalancing mechanism not shown, and which comprises an indicator 10. When a load is placed upon the platform 6, a downward pull is transmitted through instrumentalities such as levers and rods, common in the art, which causes the pendulums, not shown, to swing downwardly or upwardly, as the case may be, to that position in which the load on the platform is counter- balanced. The indicator 10 is moved over a chart 12.

The beam 14, pivoted at 15, is provided with brackets 16 and 18, upon which are carried the ratio pans 20 and 22 respectively.

The bracket 16 from which the large ratio pan 20 is suspended is, in one modification, located at such distance from the fulcrum pivot 15 of the lever 14 that one specimen of a lot of articles in the large ratio pan 20 will counterbalance ninety-nine similar articles on the platform 6. The bracket 18 from which the small ratio pan 22 is suspended is located at such a distance from the fulcrum pivot 15 of the beam 14 that, for instance, one specimen in the pan 22 will counterbalance nine similar articles in the commodity receiver. Other ratios have also been employed.

The scale so far described is similar to constructions shown in the prior art, and need not therefore be illustrated or described in detail. It is to be understood that the automatic scale mechanism illustrated is merely exemplary and that the use of other forms of automatic weighing mechanism in the combination claimed is within the scope of the invention.

The free end of a beam or other extension 24 of the main platform lever is connected by the rod 26 with the free end of the beam 14. The beam is provided with a bracket 28 from which is supported a pan 30, in the illustrated embodiment, at a ratio of nine to one with the pan 20 and eleven to one to the load point of the main platform 6.

With a weighing and counting scale constructed as above described, let it be supposed that it is desired to ascertain the weight and the number of pieces of a lot of light articles. The lot of articles is then placed on receiver 32. The operator then takes some of the articles from the scoop and places them in the large ratio pan 20. As specimens are transferred from the scoop to the large ratio pan 20, part of the load on the platform is counterbalanced by the specimens in the ratio pan 20, and as the pendulums are thus relieved of part of the pull which has elevated them, they descend and the indicator 10 moves back toward the zero position. When so many specimens have been placed in the large ratio pan 20 that the addition of another one will cause the indicator to swing beyond zero position, the operator commences placing specimens in the small ratio pan 22. As each piece is placed in the small ratio pan 22, the backward movement of the indicator 10 is much less than the backward movement caused by placing a piece in the larger pan 20. As each piece is placed in the small ratio pan 22, the backward movement of the indicator is much less than the backward movement caused by placing a piece in the larger ratio pan 20, but when nine or less pieces have been transferred from the platform to the small ratio pan, the indicator will approach so nearly to zero position that the transfer of another piece will cause it to swing beyond the zero mark. The operator then takes enough pieces from the platform to cause the indicator to register as nearly as possible with the zero mark, not placing the last pieces so taken in either of the ratio pans. Each piece in the large ratio pan 20 now counterbalances ninety-nine pieces on the platform 6 and therefore accounts for 100 pieces including itself. Each piece in the small ratio pan counterbalances nine pieces on the platform, and therefore accounts for ten pieces including itself. If, for example, the operator has placed fourteen pieces in the large ratio pan, seven in the small ratio pan, and has withdrawn three more from the platform, he will know that there are one thousand four hundred and seventy-three pieces in the lot.

Weighing facilities may be achieved by the use of the decimal beams 38 and 40 with the sliding poises 34 and 36 to counterbalance tare or weight until the indicator reads zero. The upper tare beam 28 is provided with two scales, the upper scale being ten elevenths the length of the lower scale. The upper scale is marked with one hundred graduations, each having a value of one tenth of a pound, and reading from left to right, i. e., zero to ten pounds. The lower scale is marked in one hundred graduations, each graduation having a value of one one-hundredth of a pound reading again from left to right, i. e., zero to one pound. By using the upper tare beam 38 and the upper scale, the poise 34 of which is normally sealed at the left, any material placed on the main platform may be counterbalanced by sliding the poise 34 to the right, using the center zero indication on the dial as a guide for final balancing. When so operated and balanced, weights on the main platform 6 may be handled up to ten pounds and the value of the unit graduation will be one-tenth of a pound. Using the same upper tare beam but with specimens placed in the pan 30 using the lower scale and operating in the same manner as described above, weighing may be accomplished up to one pound with unit graduation having a value of one one-hundredth of a pound.

On the lower tare beam 40, the poise is sealed or balanced at the right and this bar, graduated with one hundred graduations, when used in conjunction with weights of material put in pan 20 will permit weighing up to one tenth of a pound capacity while each of the 100 graduations has a value of one one-thousandth of a pound. The use of these decimal beams provides for many relationships useful in industry such as the quick establishment of piece per pound valuations for both small and large parts, for instance:

Let it be supposed that the customer wishes to establish standards for the packaging of one thousand or ten thousand small parts. One hundred hand-counted parts, if placed in pan 20 might be found to weigh, for instance, forty-one one-thousandths of a pound. This, being to a precision of seven grains, would be a sufficiently exact unit to permit multiplying. If one thousand parts are quickly required, the operator may point off one decimal place, giving forty-one one-hundredths of a pound, then set the upper poise 34 to this position, lock it and pour parts into scoop 30 until the indicator of the dial has reached center zero position. If ten thousand parts are required to be counted quickly, upper poise 34 may be set to 4.1 of a pound, then parts poured onto the main platform in like manner, again using the indicator and center zero to establish the balance. If it is desired, for instance, to package small parts based on lots of five thousand pieces, the operator will proceed as follows: He will hand-count five-hundred pieces and place in the bucket 20 and balance off in bucket 30. The sum of these two lots obtained on a nine to one ratio would be five thousand pieces. The novel feature is that bucket 30 is eleven times as sensitive as the main platform and small drafts of material that would show an "error" or miscount of 100 pieces on main platform, will only be nine or ten pieces out when counted in this small bucket. All these pieces are then transferred to bucket 20 and this amount of material is then weighed on the lower tare bar 40 where the reading is obtained to one-thousandth of a pound. This represents actual weight of five thousand pieces as obtained by the counting method described. Such a weight value may be entered on a card as that counting may be then duplicated at a succeeding time for the very rapid establishment of a like five-thousand piece lot. This last usage described has been accomplished heretofore only by the use of two separate and distinct scales, one scale to classify parts in terms of pieces per pound or weight of one thousand pieces, which factor is then applied to a weight obtained on a second scale of larger capacity.

Various modifications will occur to those skilled in the art in the configuration and disposition of the component elements going to make up the invention as a whole and no limitation is intended by the phraseology of the foregoing description, or illustrations in the accompanying drawings, except as indicated in the appended claims.

What is claimed is:

1. In a counting and weighing scale having a main platform lever of the third order and a supplemental beam of the first order, two counterbalancing buckets on said supplemental beam at a ratio of nine and ninety-nine, respectively, with respect to the fulcrum of the supplemental beam, a counterbalancing connecting rod between the main platform lever and the supplemental beam, the combination of a beam comprising an extension of the main platform lever having a counterbalancing bucket at a point at a ratio of eleven to one with respect to the main platform, and two tare beams on the main platform lever with scales marked in decimal graduations thereon, respectively proportional in length to each of said load points with respectively one slidable counterpoise on each of the respective tare beams.

2. In a counting and weighing scale having a main platform lever of the third order, and a supplemental beam of the first order, two counterbalancing buckets on said supplemental beam at a fixed ratio with respect to the fulcrum of the supplemental beam, a counterbalancing connecting rod between the main platform lever and the supplemental beam, the combination of a beam comprising an extension of the main platform lever having a counterbalancing bucket at a point at a fixed ratio with respect to the main platform, and two tare beams on the main platform lever with scales marked in decimal graduations thereon respectively proportional in length to each of said load points, with one slidable counterpoise on each of the respective tare beams.

3. In a counting and weighing scale having a main platform lever of the third order and a supplemental beam of the first order, two counterbalancing buckets on said supplemental beam, at a fixed ratio with respect to the fulcrum of the supplemental beam, a counterbalancing steelyard connecting the main platform lever and the supplemental beam, the combination with a beam comprising an extension of the main platform lever and having a counterbalancing bucket at a point at a fixed ratio with respect to the main platform, two tare beams on said main platform lever inscribed with scales, each of said scales being in length proportional to each of said load points, and a slidable counterpoise respectively on each of said tare beams, a counterpoise on one tare beam being oppositely disposed with respect to the counterpoise on the other said tare beam, the scales on one said tare beam reading in the opposite direction from the scales of the other said tare beam.

4. In a counting and weighing scale having a main platform lever of the third order and a supplemental beam of the first order, brackets located on the supplemental beam from which are suspended two counterbalancing buckets at a ratio of nine and ninety-nine respectively, with respect to the fulcrum of the supplemental beam, a counterbalancing connecting rod between the main platform lever and the supplemental beam, the combination of a beam comprising an extension of the main platform lever having a counterbalancing bucket at a point at a ratio of 11:1 with respect to the main platform.

MATTHEW THORSSON.

REFERENCES CITED

The following references are of record in the file of this patent:

UNITED STATES PATENTS

| Number | Name | Date |
|---|---|---|
| 694,781 | Prinz | Mar. 4, 1902 |
| 1,110,262 | Hopkinson | Sept. 8, 1914 |
| 1,238,370 | Wetzel | Aug. 28, 1917 |
| 1,330,593 | King | Feb. 10, 1920 |
| 1,379,215 | Riedel | May 24, 1921 |
| 1,790,883 | Thomas | Feb. 3, 1931 |
| 1,848,584 | Sykes | Mar. 8, 1932 |
| 1,880,443 | Hem | Oct. 4, 1932 |

FOREIGN PATENTS

| Number | Country | Date |
|---|---|---|
| 310,313 | Great Britain | Oct. 3, 1929 |
| 401,408 | Great Britain | Nov. 16, 1933 |